United States Patent

Rowen

[15] 3,639,076

[45] Feb. 1, 1972

[54] CONSTANT POWER CONTROL SYSTEM FOR GAS TURBINE

[72] Inventor: William I. Rowen, Schenectady, N.Y.
[73] Assignee: General Electric Company
[22] Filed: May 28, 1970
[21] Appl. No.: 41,512

[52] U.S. Cl. ............................................. 416/30, 60/39.28
[51] Int. Cl. ........................................ B63h 3/10, F02c 9/08
[58] Field of Search ............ 60/39.14, 39.15, 39.16, 39.28 T; 416/25, 27, 28, 29, 30; 115/34; 415/17

[56] References Cited

UNITED STATES PATENTS

| | | | |
|---|---|---|---|
| 3,520,133 | 7/1970 | Loft | 60/39.14 |
| 2,625,789 | 1/1953 | Starkey | 60/39.09 |
| 3,288,160 | 11/1966 | Eggenberger | 415/17 X |
| 3,392,696 | 7/1968 | Buckley | 115/34 |
| 3,446,224 | 5/1969 | Zwicky | 415/17 |

Primary Examiner—Clarence R. Gordon
Attorney—William C. Crutcher, Bryan C. Ogden, Frank L. Neuhauser, Oscar B. Waddell and Joseph B. Forman

[57] ABSTRACT

A gas turbine control system has a plurality of closed loop controls each responsive to a different operating condition and an additional loop control which sets the fuel control signal in accordance with a desired power setting. A gating device allows only one of the fuel control signals generated by each loop control to control the fuel flow servo means, that signal being the one calling for the smallest fuel flow. A cubic function generator is positioned in circuit with the propulsion lever and modifies the desired power signal to produce a ship speed which is linear with respect to the propulsion lever position. A feedback signal indicative of actual fuel flow is also in circuit with the propulsion lever. A first propeller pitch control is responsive to the propulsion lever position and brings the pitch from zero to full as the power setting is concurrently increased.

A second propeller pitch control is responsive to an actual shaft speed signal and is operative to hold the shaft speed relatively constant by varying pitch.

There are three modes of operation, each having a certain minimum power level and other modifications so as to improve vessel-maneuvering characteristics.

10 Claims, 2 Drawing Figures

CONSTANT POWER CONTROL SYSTEM FOR GAS TURBINE

BACKGROUND OF THE INVENTION

The present invention relates generally to a control system for a gas turbine power plant and more particularly to one that is adapted for use on marine gas turbines.

Controlling the various parameters in a large gas turbine has become quite complex, but as a result of the increasing complexity, the output characteristics have been enhanced together with an increased lifetime for many of the component parts, particularly the hot gas path parts. Such controls normally incorporate means to influence the rate of fuel flow to the gas turbine's combustion chambers in accordance with several operating parameters such as temperature, speed, load and time derivatives of these quantities. For safety reasons, it is desirable to have as many protective or backup controls as economically feasible without impairing reliability. It would, therefore, be desirable to have separate controls for the various operating parameters and at any one time during operation, one particular control would be operative to limit the particular parameter while the other controls, responsive to the different parameters, would function as backup controls. An example of such a control system is known in the art and may be seen in a U.S. Pat. application, Ser. No. 713,107, now U.S. Pat. No. 3,520,133, which issued July 14, 1970 and is assigned to the assignee of the present invention, which patent is incorporated herein by reference.

In the aforementioned U.S. Pat. No. 3,520,133 there are several individually operative control loops each responsive to a separate operating parameter. A fuel control device is responsive to that output signal from a low value gate which represents the control loop signal calling for the least amount of fuel, thereby maintaining the most desirable specific fuel consumption for the operating parameters.

In adapting the control system disclosed in the aforementioned application to marine gas turbines, it has been found that with the addition of a power control loop, the thermal fatigue stresses which result during simple speed control of marine gas turbines are substantially reduced.

In the past most of the marine power plants have been primarily concerned with having shaft speed maintained at a set point depending on desired ship speed. While at sea and during various conditions at sea, the gas turbine load will vary greatly (for example, in a heavy sea when the propeller moves partially or totally out of the water, the load varies dramatically) and with only speed control, the fuel pump will be changing the fuel flow in an attempt to maintain the desired speed. Large fluctuations in fuel flow often result and the consequence is manifested in the high thermal fatigue stress to the hot gas path parts. By maintaining a constant power setting during normal operation, the fuel flow to the combustion chambers is held at a constant value. Fuel flow is of course indicative of gas turbine power. However, it is desirable to have the position of the propulsion lever result in a control relationship linear to ship speed. By knowing that the power required by the propeller is approximately proportional to the cube of the ship speed, the propulsion lever (power set point) can be varied to provide a ship speed that corresponds directly to the propulsion lever position.

In marine applications it is necessary to provide means whereby the ship is able to move in the astern direction. One such means is a controlled reversible pitch propeller, that is, one which is able to provide full ahead as well as full astern ship movement. In operating on power control during certain phases of operation, it is desirable to have a pitch adjustment that will tend to maintain a constant desired shaft speed. For example, if an electric generator were operatively connect to the output shaft, it is necessary to maintain a set frequency by holding the shaft at a reasonably stable speed. Also, during certain phases of operation, it is advantageous to vary pitch so as to control the ship speed.

It should be recognized that in most marine applications, a two-shaft gas turbine will be utilized, that is, one where a constant power setting will result in a constant fuel flow to the combustion chambers while allowing the load turbine to change speed with changes in propeller torque (load).

Another feature of a marine gas turbine that must be provided in order to satisfy various regulations and the ship's captain is maneuverability. In docking a large oceangoing vessel, it would be desirable to maintain a certain minimum shaft power output while controlling ship speed by varying propeller pitch. It is also desirable to provide other operating modes which will suit the particular requirements of the ship to the gas turbine.

Accordingly, from the foregoing, one object of the present invention is to reduce abrupt changes in fuel flow to the combustion chambers by having a constant power setting, which in turn reduces thermal fatigue stresses in the hot gas path parts.

Another object of the invention is to provide an improved marine gas turbine control system which integrates normal operating functions with a power control loop in an automatic solid state electronic control system.

Yet another object of the invention is to provide a plurality of loop control means where one is always responsive to the operating condition requiring the least fuel flow to the combustion chambers.

Still a further object of the invention is to provide different ship-operating modes which match the desired ship maneuverability with a minimum power output.

One additional object is to provide a pitch governor for the propeller that will substantially maintain a shaft set speed.

SUMMARY OF THE INVENTION

Briefly stated, the invention is practiced in one form by applying to an electrical gating device a plurality of electrical fuel control signals, one of which represents a called for fuel flow depending on a desired power setting. The power control loop is responsive to an electrical feedback signal indicative of actual fuel flow. The gating device allows only the lowest-valued signal to control fuel flow to the combustion chambers. Another feature of the invention is the pitch governor which is responsive to a shaft speed signal in order to maintain a desired shaft speed by varying the propeller pitch.

DESCRIPTION OF THE DRAWING

The subject matter which is regarded as the invention is particularly pointed out and distinctly claimed in the concluding portion of the specification. The invention, however, both as to organization and method of practice, together with further objects and advantages thereof, may best be understood by reference to the following description, taken in connection with the accompanying drawing, in which:

DESCRIPTION OF THE PREFERRED EMBODIMENT

Figure 1:
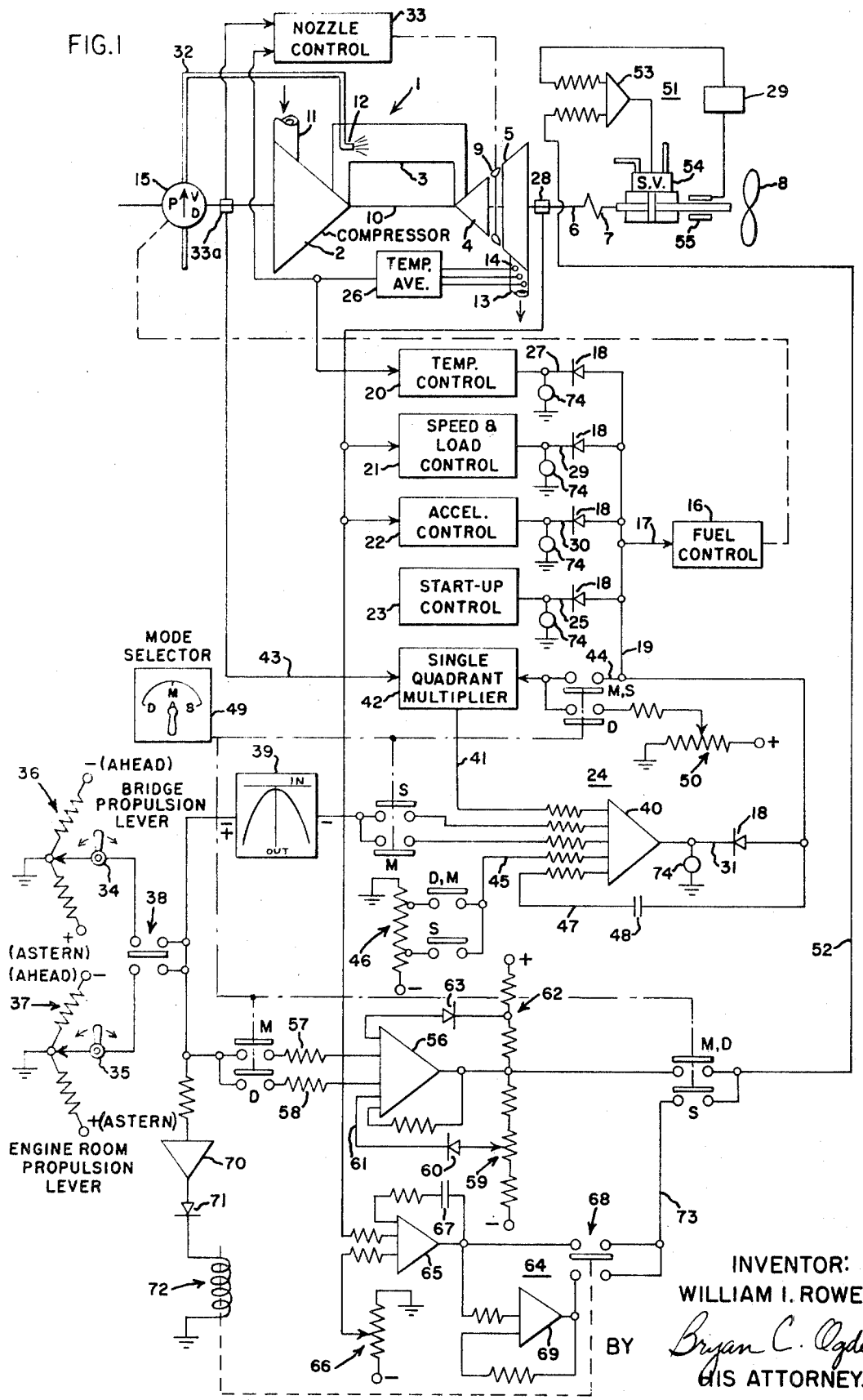
FIG. 1 is a simplified schematic diagram of a DC-analog control and two shaft gas turbine for carrying out the objects of the invention.

Referring to FIG. 1 of the drawing, a simplified representation of a two-shaft gas turbine, indicated generally as 1, includes a compressor 2, combustion chamber 3, high-pressure turbine 4, and load turbine or low-pressure turbine 5. It is known in the art that in certain gas turbine applications, it is desirable to have both the high-pressure turbine 4 which drives the compressor 2, and the load turbine 5 which is mounted on a separate shaft, indicated as 6, and drives a load. In the application shown in FIG. 1, the load turbine shaft 6 is connected through a set of reduction gears, symbolically shown at 7, to a propeller 8. Propeller 8 is of the controllable reversible pitch variety and its detail will be more fully described later.

A variable area second stage nozzle 9 aerodynamically couples the high-pressure turbine 4 with the load turbine 5. Variable area nozzles are also well known in the art and an example of one, with its attending control system, may be seen by referring to U.S. Pat. No. 2,625,789 issued on Jan. 20, 1953 to N. E. Starkey and assigned to the assignee of the present invention. The details of second stage nozzle 9 are not material to the present invention and suffice it to say that its main function is to vary the division of energy between the two turbine stages. Also, by varying the area of second stage nozzle 9, the speed of the compressor high-pressure turbine shaft 10 is increased or decreased as desired, while the speed of the load turbine shaft 6 is varied independently.

Air entering the compressor inlet at 11 supports the combustion of fuel injected by nozzle 12 in the combustion chamber 3. The heated exhaust gases, after passing through the high-pressure turbine 4 and load turbine 5, exit from the turbine outlet 13 past distributed temperature sensors such as 14 measuring exhaust temperature. A variable delivery fuel pump 15 is mounted on the compressor-high-pressure turbine shaft 10 and delivers fuel to nozzle 12 at a rate of flow which depends both upon the rotational shaft speed of shaft 10 and the pump stroke which is set by a fuel control servo 16. The details of fuel control servo 16 are not material to the present invention since it may include any servomechanism which positions the stroke-setting control on the pump at a position corresponding to an electrical-positioning signal, there being many devices on the market suitable for such use. Also, since the gas turbine may utilize gaseous fuel, in which case a gas valve position would control fuel flow to the combustion chamber, the term "fuel control signal" is used to designate the signal regardless of the type of fuel used.

The fuel control signal is a single-valued electrical signal which appears on line 17 and is applied to fuel control 16 by a low-value gate comprised of a plurality of diodes 18. Diodes 18 are poled as shown with respect to a common bus 19, from which leads the fuel control signal on line 17. The function of the low-value gate is explained in the issued U.S. Pat. No. 3,520,133 but may be briefly summarized as follows. Whichever diode has the least positive voltage at its input side will be in control, that is, will establish the output voltage on bus 19 and line 17 thereby determining the fuel flow rate by the fuel pump 15. The fuel control signal can therefore be no higher than the lowest control signal applied to the low-value gate.

Each control signal applied to the low-value gate is derived from a separate control channel, each intended to be controlling over a certain phase of the gas turbine operation.

One portion of the present invention is comprised of the subject matter disclosed in the aforementioned U.S. Pat. No. 3,520,133. In particular, the temperature control means 20, the speed and load control means 21, the acceleration control means 22, and the open-loop startup means 23 were disclosed, as was the operation of the low-value gate comprised of the plurality of diodes 18, each being responsive to a different control signal. The addition of a power control loop, generally indicated as 24 is the subject matter of the present invention, and will be fully described later.

The operation of the four control means shown in the aforementioned U.S. Patent is substantially identical in the present invention. Briefly, each control means senses an operating condition of the gas turbine and compares it to a desired reference. The open-loop startup control 23 produces a programmed fuel control signal on line 25 in accordance with timed events occurring in the gas turbine, such as a certain speed, detection of flame in the combustion chamber and the like. It should be understood that all of the control means are not required for the present invention although each is being briefly described.

The temperature control means 20 senses the exhaust temperature with the use of the several temperature sensors 14. An average temperature is derived from a temperature averager 26 which is then an input to the temperature control means 20. An error signal is generated as the output on line 27 when the actual exhaust temperature differs from the temperature reference.

The speed and load control means 21 operates in basically the same manner. An actual speed signal is derived from a magnetic pickup 28 mounted on the load turbine shaft 6. The actual speed signal is compared with a speed reference and the error signal, if any, appears as an output on line 29 as one fuel control signal.

The acceleration control means 22 produces a fuel control signal on line 30 which is designed to limit turbine acceleration during startup or during loss of load. The control signal is produced by differentiating an actual speed signal derived from the magnetic pickup 28 and comparing it with an acceleration reference.

The power control loop 24, to be described in detail shortly, likewise produces a fuel control signal which appears on line 31. As previously mentioned, each fuel control signal is applied to its respective diode 18. The fuel control signal indicative of the lowest fuel flow to the combustion chamber 3 will appear at the common bus 19 and on line 17. It should be noted that although only one fuel control signal is operative with respect to fuel control servo 16, each of the other fuel control signals operate as backup protection. Should the proper controlling signal become inoperative, then that fuel control signal producing the next lowest fuel flow will pass through the low-value gate. It should also be noted that the dot-dash line between the fuel control servo 16 and fuel pump 15 represents the signal which changes the fuel pump stroke, thereby changing the fuel flow rate through fuel line 32 to combustion chamber 3.

The fuel control system just described in general form is integrated with the nozzle control 33. It is the fuel flow to the combustion chamber 3 that determines the total energy while the nozzle control 33 divides the energy between the load turbine 5 and high-pressure turbine 4. The nozzle control is responsive to two main input signals. An inductor alternator 33a is mounted on the compressor shaft 10 such that it produces a speed signal indicative of compressor speed and therefore high-pressure turbine speed. The set point for the compressor speed is exhaust temperature from the temperature average 26. The output signal from nozzle control 33 appearing on the dot-dash line controls the angle of the second stage nozzle 9. It is to be noted that the nozzle control 33 may be either electrical or electromechanical as shown in the aforementioned U.S. Pat. No. 2,625,789.

POWER CONTROL LOOP

The power control loop 24 is responsive to a power set point and a feedback signal indicative of actual fuel flow. The power control loop 24 shown in FIG. 1 represents a simplified control schematic for maintaining constant power and therefore constant fuel flow (total energy) to the gas turbine combustion chamber. It is noted that certain functions which are immaterial to the description of the present invention are omitted for simplicity and in order not to obscure the invention. Also, adjustable voltage reference sources have been indicated as variable tap potentiometers connected between a voltage source and ground whereas in practice they could also include suitable combinations of digital-switching devices to provide connection to various voltage levels. Further, the switching devices are depicted as make-and-break contactors with physical armatures, whereas in actual practice, they may be solid-state-switching devices controlled in accordance with a logic system, the details of which are not material to the present invention.

Turning now to a detailed description of the power control loop 24, the power set point is derived from either the bridge propulsion lever 34 or the engineroom propulsion lever 35, each operating to vary the voltage from respective fixed voltage sources 36, 37. The polarity indicated on the voltage sources 36, 37 is the chosen convention and it may be reversed if desired. A negative going power set point indicates an ahead command. A contactor 38 operates as the control transfer relay, that is, contactor 38 closes either the bridge propulsion lever circuit or the engineroom propulsion lever circuit depending on which location is controlling the movement of the vessel.

The power set point voltage is modified in a cubic function generator indicated at 39. Since it is desirable to have the vessel's speed approximately proportional to the position of the propulsion levers 34, 35, the voltage reference (power set point) must be modified accordingly. The power required by propeller 8 is approximately proportional to the cube of the vessel speed; therefore, the output of the cubic function generator 39 represents the cube of the input. It will be realized that the output of function generator 39 represents the desired power signal for the input to the power control amplifier 40. The function generator is known in the art and is commercially obtainable in suitable form. It accepts either a positive or negative signal as an input, but always produces a negative output as the modified power set point.

Since it is desired to maintain a reasonably constant fuel flow, then the output power of the load turbine 5 is constant and essentially independent of load turbine speed. The actual fuel flow is proportional to the product of the control signal appearing on line 17 and the signal representing compressor speed. The modified power signal, or desired fuel flow, is the set point for the power control amplifier 40 while the feedback signal represents the actual fuel flow or power.

The feedback to power amplifier 40 appears on line 41 and is the output of a single quadrant multiplier 42 which is commercially obtainable in suitable form. The inputs to multiplier 42 are the compressor shaft speed signal on line 43 and the fuel control signal then in command appearing on the common bus 19 and passing through line 44 to the multiplier 42. The action of the power control loop 24 is as previously described; if the output of the power control amplifier 40 on line 31 is lower than the outputs of the other control means, and only then will it be the fuel control signal which passes through its diode 18 to appear on line 17.

It is apparent from FIG. 1 that there are additional inputs to the power control amplifier 40. One such input is a minimum power bias appearing on line 45 and derived from a variable voltage source generally indicated at 46. The minimum power bias (or minimum fuel flow) provides a fuel control signal necessary to insure a compressor shaft speed sufficient to allow self-sustaining fuel flow. Another input to power control amplifier 40 is a feedback signal appearing on line 47 and representative of transient variations in the fuel control signal at the common bus 19. A capacitor 48 integrates the transient change and applies it to the power amplifier 40. Each input to the amplifier 40 is modified by a suitable valued impedance indicated by resistors in the drawing.

A mode selector indicated at 49 is operatively connected to each of the contactors indicated by the symbols D, M, and S (denoting Docking, Maneuvering and Sea). In the power control loop, the mode selector 49 operates to change minimum power level appearing on line 45, the signal appearing on line 44, and the gain of the desired modified power signal (fuel flow) to the power control amplifier. The D mode is operative when it is desired to dock the vessel or perform other very slow maneuvers. It is noted, and it will be described in detail later, that in this mode, that is, when the D contacts are closed, there is no power set point signal going to the amplifier 40. The variable pitch propeller is in primary control. A minimum power set point is provided by the voltage source 46 and a constant but adjustable reference voltage 50 is applied to the multiplier 42. Thus, the power control loop is in this mode a simple governor for the high-pressure turbine and compressor. This cuts the power (and ship speed) gain of the propulsion lever by a factor of about four. That is, in the D mode with propulsion lever 34 or 35 in the full-ahead position, ship speed will be 25 percent of the normal speed range in either the M or S modes, both being the same.

In the M and S modes, indicating normal maneuvering and at sea respectively, those contacts so indicated are closed at complete the appropriate circuits. In the M mode, the modified power signal from the function generator 39 is further modified through an input resistor. In the S mode the value of this resistance is slightly smaller, compensating for a higher minimum power level from voltage source 46. In the M and S modes the fuel control signal going to the multiplier 42 is again the signal then in control of fuel control servo 16.

PROPELLER PITCH CONTROLS

As mentioned, it is necessary to provide astern operation for the ship and in certain cases to maintain the output shaft speed substantially constant. The further objects of the invention are in part accomplished through a propeller pitch control, generally indicated at 51. The output of the first pitch control 51 appears on line 52 and is the input to operational amplifier 53 which in turn has its output connected to control a servo valve 54. Servo valve 54 operates to vary the pitch of propeller 8. The actual pitch of the propeller is sensed by an LVDT (linear variable differential transformer) 55, whose signal is demodulated at 29 to provide a feedback signal proportional to the actual pitch. It is to be noted that the propeller will normally have O pitch during startup of the gas turbine. When it is desired to add power, then the pitch control 51 will become operative. The pitch controller in the M and D modes operates through an operational amplifier 56. The same power signal derived from either voltage source 36 or 37 (unmodified by the cubic function generator 39) is applied to amplifier 56 in either the M or D mode. In this instance, the power control signal is calling for a desired constant pitch corresponding to a desired vessel speed.

Figure 2:
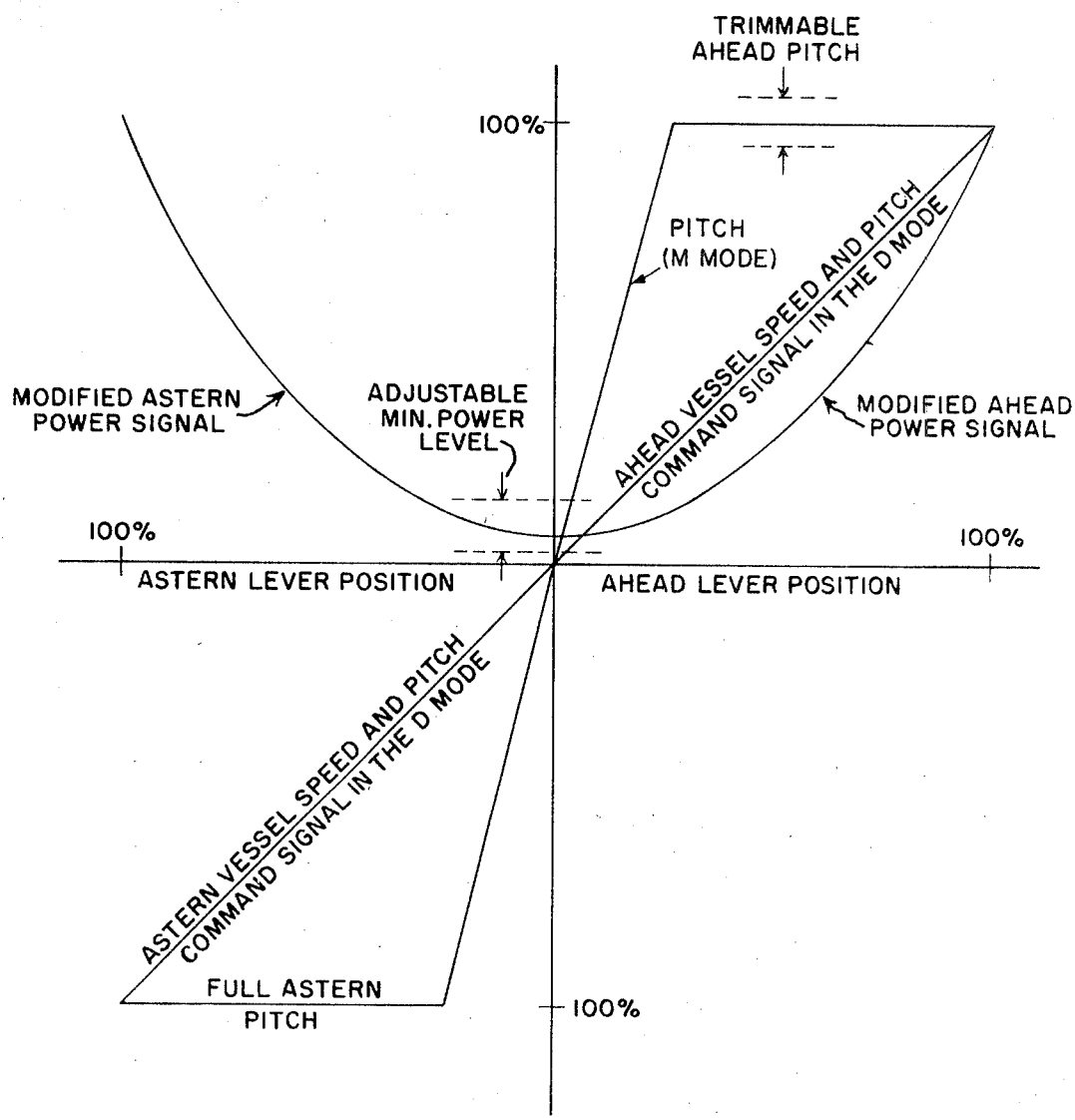
FIG. 2 is a graph showing the variation in several parameters with change in propulsion lever position.

It is desirable to bring the propeller pitch to its maximum value early in the propulsion lever travel so as to integrate its effect on vessel speed. In order to maintain a reasonably linear relationship between propulsion lever position and ship speed, the input resistors 57, 58 to the amplifier 56 are chosen accordingly. By referring to FIG. 2 of the drawing, it may be seen that for the M mode, the pitch reaches its maximum when the propulsion lever is about 25 percent of full travel, while in the D mode it reaches full pitch at full travel, since in the D mode only minimum power is maintained while pitch controls vessel speed. In the M and D modes there is a maximum ahead pitch adjustment indicated generally at 59 in order to allow compensation for various loading conditions, and thus operate at the optimum pitch while at sea. The diode 60 passes the signal on line 61 until a certain level is reached at which point the pitch can be trimmed to the proper position without exceeding the blocking limit of the diode 60. The maximum astern pitch is fixed by a reference voltage indicated at 62. When the reverse pitch reaches its maximum value, the diode 63 will block further changes in pitch.

It is noted that function generator 39 may be modified to provide two-thirds full speed in the astern direction when the propulsion lever 34 or 35 is in the full power position. In certain marine gas turbine applications, this is a desirable feature.

In the S mode, a second pitch control loop 64 is operative in place of the previously discussed first pitch control. One purpose of such a loop is to provide a second load turbine shaft speed control in addition to speed control means 21. The pitch control loop 64 operates as a shaft speed governor in both the ahead and astern propulsion lever positions. An operational amplifier 65 has as inputs thereto a speed signal from the magnetic pickup 28 indicative of load turbine speed and an adjustable reference voltage indicated as 66. Amplifier 65 has a capacitive feedback network 67 which serves to integrate any error signal appearing at the output of amplifier 65. In the ahead propulsion lever position, contactor 68 will be in the lower position, thereby incorporating the sign-inverting operational amplifier 69 into the circuit 64. If the propulsion lever 34 or 35 is moved to the astern position, then the comparing amplifier 70 and its associated diode 71 and coil 72 will not be operative to pull contactor 68 to its lower position, but will allow the contactor to remain in the upper position, thereby bypassing the sign-inverting amplifier 69. The respective signal appearing on lines 73 and 52 then serves to vary the pitch of propeller 8 so as to maintain the speed of the load turbine shaft 6 at a constant shaft speed for any power set point when either in the ahead or astern position. This isochronous speed control loop will be referred to as the second pitch control circuit in future reference. Therefore, changes in the ship speed throughout the power set point range are effected solely by corresponding changes in the propeller pitch. The above changes in propeller pitch are substantially linear to the various power set points thereby necessarily rendering the ship's speed linear to any power set point since the ship speed is equal to the product of propeller speed and propeller pitch.

It is noted that when the mode selector 49 is in the S position, the minimum power level to the power control amplifier 40 is increased accordingly. This may be seen graphically by referring to FIG. 2.

OPERATION OF THE INVENTION

Although individual components and individual loops have been described in terms of their operation, a brief description will now be made of the overall system operation.

The gas turbine is first brought up to a full speed no load condition through the startup control means, the temperature control means, and the acceleration control means. This operation is described in the U.S. Pat. No. 3,520,133 to A. Loft et al. At this point, the speed control loop is set at 102 percent of design speed and remains there as an isochronous topping governor while the gas turbine is on power control. Each control loop has an indicating light 74 which tells the operator when that particular loop is in control.

The gas turbine is now ready to provide operative power to the load turbine output shaft over and above the minimum power zero pitch condition. Assuming the bridge propulsion lever is to be in control and that the mode selector is in the M position, an increase in the propulsion lever position toward the full ahead position will cause the vessel to move at the speed directly proportional to the power set point (power lever position). This is accomplished after the power set point is modified in the cubic function generator and is compared with the actual fuel flow feedback signal. The power control loop will be in control at this point providing the fuel control signal calling for the lowest fuel flow. The minimum power set point will be providing a portion of the total power signal. As the ahead propulsion lever position is further increased, the desired ahead power signal increases in cubic relationship, thus providing the desired ship speed relationship to the propulsion lever setting. The feedback to the power control amplifier will be relatively constant since the speed signal is taken from the compressor shaft speed. As such, at a desired power level the fuel control signal on the output line of the power control amplifier will be relatively constant, thereby eliminating the severe thermal stresses to the hot gas path parts caused by abrupt changes in fuel flow. Correspondingly, as the propulsion lever is moved in the ahead direction, the zero pitch will increase to full pitch at approximately 25 percent of full lever travel. The resulting vessel speed is shown as increasing linearly with increasing propulsion lever position. The nozzle control, during this phase of operation, is operating essentially independent of the fuel control system.

During the D mode of operation, a minimum power level provides a constant fuel flow to the combustion chamber. As the propulsion lever is moved toward the full ahead position, the pitch of the propeller will increase, creating the desired ship speed. The fuel flow during this mode will also remain relatively constant for the various propulsion lever positions. The change in propeller pitch in this mode follows the change in ship speed linearly and consequently is superimposed on the ahead vessel speed curve of FIG. 2.

In the at sea or S mode, the second pitch control circuit is actuated as a result of an increased minimum power set point. This pitch control maintains a shaft set speed by varying the propeller pitch. In a crash reversal situation, a nearly constant shaft speed is maintained subsequent to the comparing amplifier 70 sensing the change in direction and nearly instantaneously flipping the position of contactor 68.

It is again stated that although the power loop is in control of the fuel control signal, the other control means are functioning as backup units.

While there is shown what is considered at present to be the preferred embodiment of the invention, it is of course understood that various other modifications may be made therein, and it is intended to cover in the appended claims all such modifications as fall within the true spirit and scope of the invention.

What is claimed is:

1. Apparatus for controlling fuel flow in a gas turbine adapted to proper a vessel and having means for supplying fuel to a combustion chamber of the gas turbine in accordance with a fuel control signal, comprising:
   a plurality of closed-loop control means, each responsive to a different respective operating parameter of the gas turbine and each arranged to supply a respective fuel control signal;
   means for setting a desired power setting for the gas turbine;
   an additional closed-loop control means for supplying an additional fuel control signal responsive to the desired power setting; and
   gating means responsive to the lowest fuel control signal of said plurality of closed-loop means and said additional closed-loop control means for controlling the fuel flow to the combustion chamber.

2. The combination according to claim 1 in which the additional closed-loop control means includes a cubic function generator to modify the desired power setting to provide a fuel control signal which is in substantially linear relationship between speed of said vessel and desired power setting.

3. The combination according to claim 1 in which the additional closed-loop control means includes an electronic multiplier in which the load shaft speed and that fuel control signal then in control of the means for supplying fuel to the combustion chamber of the gas turbine are multiplied together to produce a feedback signal representative of actual fuel flow.

4. In a control for a two-shaft gas turbine adapted for marine use, including a compressor shaft and a load shaft, and having a propeller attached to the load shaft, the control having means for supplying fuel to the combustion chamber of the gas turbine in accordance with an electrical fuel control signal, the combination comprising:
   a plurality of closed-loop control means, each responsive to a different respective operating parameter of the gas turbine and each arranged to supply a respective fuel control signal;
   means for setting a desired power setting for the gas turbine;
   an additional closed-loop control means for supplying an additional fuel control signal responsive to the desired power setting;
   gating means responsive to the lowest fuel control signal of said plurality of closed-loop control means and said additional closed-loop control means for controlling the fuel flow to the combustion chamber;
   means for developing a shaft speed signal;
   means for developing a temperature signal;
   a nozzle;
   nozzle control means for controlling the angle of said nozzle and proportioning the energy developed by the gas turbine between
   the compressor shaft and the load shaft; and
   said nozzle control means being responsive to the shaft speed signal and temperature signal to thereby adjust the angle of said nozzle.

5. The combination according to claim 4 in which a plurality of minimum power signals are sequentially added to the additional closed-loop control means by a maneuvering mode selector thereby giving maneuvering flexibility to the two-shaft gas turbine.

6. In a control for a two-shaft gas turbine adapted for marine use, including a compressor shaft and a load shaft, and having a controllable reversible-pitch propeller attached to the load shaft, the control having means for supplying fuel to the combustion chamber of the gas turbine in accordance with an electrical fuel control signal, the combination comprising:
a plurality of closed-loop control means, each responsive to a different respective operating parameter of the gas turbine and each arranged to supply a respective fuel control signal;
means for setting a desired power setting for the gas turbine;
an additional closed-loop control means for supplying an additional fuel control signal responsive to the desired power setting;
gating means responsive to the lowest fuel control signal of said plurality of closed-loop control means and said additional closed-loop control means for controlling the fuel flow to the combustion chamber;
means for developing a compressor shaft speed signal;
means for developing a temperature signal;
a nozzle;
nozzle control means for controlling the angle of said nozzle and proportioning the energy developed by the gas turbine between the compressor shaft and the load shaft; and
said nozzle control means being responsive to the compressor shaft speed signal and temperature signal to thereby adjust the angle of said nozzle.

7. The combination according to claim 6 further including a first pitch control means responsive to the desired power setting and arranged to vary the pitch from zero at zero power setting to full pitch at a point in the range between zero power setting and full power setting.

8. The first pitch control means according to claim 7 in which the full pitch position of the propeller is adjustable to provide the most efficient pitch for varying sea conditions.

9. In a control for a two-shaft gas turbine adapted for marine use such as a vessel including a controllable reversible pitch propeller attached to a load shaft coupled to the gas turbine and to be operated at a desired load shaft speed, and further having means for supplying fuel to a combustion chamber of the gas turbine in accordance with a fuel control signal, the combination of:
a fuel control comprising:
power setting means having a manual input device and including a function generator for providing a first reference fuel control signal in order that the position of said input device is in substantially linear relationship with a desired vessel speed;
means for developing a first feedback signal representative of actual fuel flow to the combustion chamber;
means for comparing said first reference and said first feedback signals and controlling fuel flow to reduce the difference between said signals to zero;
and a pitch control comprising:
means for providing an adjustable second reference signal representative of the desired load shaft speed;
means for developing a second feedback signal representative of the actual load shaft speed;
means for comparing said second reference and second feedback signals and for adjusting propeller pitch in accordance with the difference therebetween so as to maintain the actual load shaft speed substantially equal to the desired load shaft speed at any power level.

10. The combination according to claim 9, wherein said control further includes:
means for controlling ahead or astern power to said vessel said means comprising:
comparing means to sense the position of said input device, to determine whether ahead or astern power is desired; and
an inverting amplifier responsive to said comparing means and arranged to alter the polarity of the output signal of said pitch control in accordance with the desired vessel propulsion direction.

* * * * *